United States Patent
Sharifi et al.

(10) Patent No.: US 11,914,660 B2
(45) Date of Patent: Feb. 27, 2024

(54) COLLABORATIVE SEARCH SESSIONS THROUGH AN AUTOMATED ASSISTANT

(71) Applicant: GOOGLE LLC, Mountain View, CA (US)

(72) Inventors: Matthew Sharifi, Kilchberg (CH); Victor Carbune, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/554,608

(22) Filed: Dec. 17, 2021

(65) Prior Publication Data

US 2023/0195815 A1 Jun. 22, 2023

(51) Int. Cl.
*G06F 16/9536* (2019.01)
*G06F 16/9535* (2019.01)
*G06F 16/2455* (2019.01)
*G06F 16/9538* (2019.01)

(52) U.S. Cl.
CPC ...... *G06F 16/9536* (2019.01); *G06F 16/2456* (2019.01); *G06F 16/9535* (2019.01); *G06F 16/9538* (2019.01)

(58) Field of Classification Search
CPC ............ G06F 16/9536; G06F 16/9535; G06F 16/9538
See application file for complete search history.

(56) References Cited

U.S. PATENT DOCUMENTS

| | | | | |
|---|---|---|---|---|
| 2010/0161544 A1* | 6/2010 | Song | ...................... | G06Q 30/02 706/52 |
| 2013/0173569 A1* | 7/2013 | Pearcy | ................ | G06F 16/9038 707/706 |
| 2014/0280294 A1* | 9/2014 | Stekkelpak | ......... | G06F 16/9535 707/769 |
| 2016/0350825 A1* | 12/2016 | Hertschuh | .......... | G06Q 30/0637 |
| 2017/0134335 A1* | 5/2017 | Goldstein | ............... | H04L 67/53 |
| 2019/0325079 A1 | 10/2019 | Blake | | |
| 2020/0184156 A1* | 6/2020 | Badr | ....................... | G06F 9/468 |
| 2020/0334307 A1* | 10/2020 | Prasad | ................ | G06F 16/9535 |
| 2020/0396019 A1* | 12/2020 | Lumbatis | ............ | H04W 64/006 |

OTHER PUBLICATIONS

Australian Patent Office; Examination Report issued in Application No. 2022268339; 6 pages; dated May 19, 2023.
Australian Patent Office; Examination Report issued in Application No. 2022268339; 3 pages; dated Oct. 10, 2023.

* cited by examiner

*Primary Examiner* — Mariela Reyes
*Assistant Examiner* — Fatima P Mina
(74) *Attorney, Agent, or Firm* — Gray Ice Higdon (57) ABSTRACT

Techniques are described herein for collaborative search sessions through an automated assistant. A method includes: receiving, from a first user of a first client device, a first query in a query session; providing, to the first user, a first set of search results; determining, based on at least one term in the first query, that the first query is relevant to a second user of the first client device; providing, to the second user, a selectable option to join the query session; in response to receiving, from the second user, an indication of acceptance of the selectable option, adding the second user to the query session; receiving, from the second user, additional input; generating, based on the additional input received from the second user, a modified set of search results; and providing, to the first user and the second user, the modified set of search results.

20 Claims, 4 Drawing Sheets

COLLABORATIVE SEARCH SESSIONS THROUGH AN AUTOMATED ASSISTANT

BACKGROUND

Humans can engage in human-to-computer dialogs with interactive software applications referred to herein as "automated assistants" (also referred to as "digital assistants", "digital agents", "interactive personal assistants", "intelligent personal assistants", "assistant applications", "conversational agents", etc.). For example, humans (which when they interact with automated assistants may be referred to as "users") may provide commands and/or requests to an automated assistant using spoken natural language input (i.e., utterances), which may in some cases be converted into text and then processed, by providing textual (e.g., typed) natural language input, and/or through touch and/or utterance free physical movement(s) (e.g., hand gesture(s), eye gaze, facial movement, etc.). An automated assistant responds to a request by providing responsive user interface output (e.g., audible and/or visual user interface output), controlling one or more smart devices, and/or controlling one or more function(s) of a device implementing the automated assistant (e.g., controlling other application(s) of the device).

An automated assistant may be a software application that executes on a client device. The client device may be a standalone interactive speaker, a standalone interactive display device (which may also include a speaker and/or camera), a smart appliance such as a smart television (or a standard television equipped with a networked dongle with automated assistant capabilities), a desktop computing device, a laptop computing device, a tablet computing device, a mobile phone computing device, a computing device of a vehicle of the user (e.g., an in-vehicle communications system, an in-vehicle entertainment system, an in-vehicle navigation system), and/or a wearable apparatus of the user that includes a computing device (e.g., a watch of the user having a computing device, glasses of the user having a computing device, a virtual or augmented reality computing device).

In some cases, an automated assistant may be used by multiple users (e.g., multiple members of a particular household or family), particularly in the case of automated assistants executing on client devices such as standalone interactive speakers, standalone interactive display devices, and smart appliances that may be shared amongst the users. In other cases, an automated assistant may only be used by a single user, particularly in the case of an automated assistant executing on client devices such as mobile phone computing devices that are less commonly shared.

Multiple users may conduct similar or redundant searches using an automated assistant that executes on a client device that is shared by the users. For example, two members of a particular household who are shopping for a new television may each use an automated assistant that executes on a standalone interactive display device to execute separate searches for a television. Each of these users may perform multiple searches, as they separately refine their individual searches with newly added constraints. In the case where multiple users separately perform and refine searches for the same topic, e.g., a television, multiple activations of the automated assistant can waste network and/or computational resources. Additionally, the user experience may be negatively impacted when a second user repeats searches already performed by a first user.

SUMMARY

Some implementations disclosed herein are directed to collaborative search sessions through an automated assistant. As described in more detail herein, collaborative search sessions (e.g., product search sessions) may be detected and maintained across multiple users. These search sessions may be longer term (e.g., continuing over multiple hours or days) and may be made available to two or more participants on automated assistant devices, which may be used as input methods for continuously refining a product search in the search session until a product has been selected and a purchase has been completed. In some implementations, these collaborative product search sessions may be utilized to search for and purchase a single item (e.g., a television) or multiple items (e.g., groceries for a household).

In various implementations, a method implemented by one or more processors may include: receiving, from a first user of a first client device, by a first automated assistant executing on the first client device, a first query in a query session; providing, by the first automated assistant, to the first user, a first set of search results for the first query; determining, based on at least one term in the first query, that the first query is relevant to a second user of the first client device; providing, by the first automated assistant, to the second user of the first client device, a selectable option to join the query session, in response to determining that the first query is relevant to the second user; in response to receiving, from the second user, an indication of acceptance of the selectable option to join the query session, adding the second user to the query session; receiving, from the second user, additional input to refine the first query; generating, based on the additional input received from the second user, a modified set of search results; and providing, by the first automated assistant, to the first user and the second user, the modified set of search results.

In some implementations, the query session is a shopping session; the first set of search results includes a first set of products; and the modified set of search results includes a modified set of products. In some implementations, the first client device is an automated assistant device; providing the first set of search results includes the first automated assistant causing the first set of search results to be provided on a display of a mobile device of the first user; and providing the modified set of search results includes the first automated assistant causing the modified set of search results to be provided on the display of the mobile phone of the first user and on a display of a mobile device of the second user.

In some implementations, the method may further include providing, by the first automated assistant, to the first user, a selectable option to allow the second user of the first client device to join the query session. Providing, to the second user, the selectable option to join the query session may be further in response to receiving, from the first user, an indication of acceptance of the selectable option to allow the second user of the first client device to join the query session.

In some implementations, the method may further include determining a predicted interest level of the second user in the query session. Determining that the first query is relevant to the second user may be further based on the predicted interest level of the second user in the query session satisfying a threshold. The predicted interest level of the second user in the query session may be based on a query history of the second user.

In some implementations, the method may further include determining an environmental context. Determining that the first query is relevant to the second user may be further based on the environmental context. In some implementations, the method may further include determining a frequency of interaction of the second user with the first client device. Determining that the first query is relevant to the second user may be further based on the frequency of interaction of the second user with the first client device satisfying a threshold. In some implementations, determining that the first query is relevant to the second user of the first client device may be based on a score for one of the at least one term in the first query satisfying a threshold.

In some implementations, the method may further include automatically determining, by the first automated assistant, a filter term based on an inferred preference of the second user. Generating the modified set of search results may be further based on the filter term. In some implementations, a second client device receives the additional input.

In some implementations, generating the modified set of search results may include: determining, by the first automated assistant, a second query based on the first query and the additional input; and generating the modified set of search results based on a second set of search results for the second query. In some implementations, generating the modified set of search results may include filtering the first set of search results based on the additional input.

In some additional or alternative implementations, a computer program product may include one or more computer-readable storage media having program instructions collectively stored on the one or more computer-readable storage media. The program instructions may be executable to: receive, from a first user of a first client device, by a first automated assistant executing on the first client device, a first query in a query session; provide, by the first automated assistant, to the first user, a first set of search results for the first query; receive, by the first automated assistant, from a second user of the first client device, additional input to refine the first query; in response to receiving, from the second user, the additional input to refine the first query, add the second user to the query session; generate, based on the additional input received from the second user, a modified set of search results; and provide, by the first automated assistant, to the first user and the second user, the modified set of search results. The modified set of search results may be provided to the second user based on adding the second user to the query session.

In some implementations, the query session may be a shopping session; the first set of search results may include a first set of products; and the modified set of search results may include a modified set of products.

In some implementations, the first client device may be an automated assistant device; providing the first set of search results may include the first automated assistant causing the first set of search results to be provided on a display of a mobile device of the first user; and providing the modified set of search results may include the first automated assistant causing the modified set of search results to be provided on the display of the mobile phone of the first user and on a display of a mobile device of the second user.

In some implementations, the program instructions may be further executable to automatically determine, by the first automated assistant, a filter term based on an inferred preference of the second user. Generating the modified set of search results may be further based on the filter term.

In some implementations, the program instructions may be further executable to: determine an identity of the second user based on a voice of the second user detected by a microphone of the first client device or based on a face of the second user detected by a camera of the first client device; and identify a mobile device of the second user based on the identity of the second user. Adding the second user to the query session in response to receiving the additional input may include adding the mobile phone of the second user to the query session. Providing the modified set of search results to the second user may include the first automated assistant causing the modified set of search results to be provided on a display of the mobile phone of the second user based on adding the mobile phone of the second user to the query session.

In some implementations, the program instructions may be further executable to: determine an identity of the second user based on a voice of the second user detected by a microphone of the first client device or based on a face of the second user detected by a camera of the first client device; and identify a user account of the second user based on the identity of the second user. Adding the second user to the query session in response to receiving the additional input may include adding the user account of the second user to the query session Providing the modified set of search results to the second user may be based on subsequently detecting the second user based on the voice of the second user or based on the face of the second user.

In some additional or alternative implementations, a system may include a processor, a computer-readable memory, one or more computer-readable storage media, and program instructions collectively stored on the one or more computer-readable storage media. The program instructions may be executable to: receive, from a first user of a first client device, by a first automated assistant executing on the first client device, a first query in a query session; provide, by the first automated assistant, to the first user, a first set of search results for the first query; determine, based on at least one term in the first query, that the first query is relevant to a second user of the first client device; provide, by the first automated assistant, to the second user of the first client device, a selectable option to join the query session, in response to determining that the first query is relevant to the second user; in response to receiving, from the second user, an indication of acceptance of the selectable option to join the query session, add the second user to the query session; receive, from the second user, additional input to refine the first query; generate, based on the additional input received from the second user, a modified set of search results; and provide, by the first automated assistant, to the first user and the second user, the modified set of search results.

Through utilization of one or more techniques described herein, occurrences of multiple activations of the automated assistant that can waste network and/or computational resources when multiple users conduct similar or redundant searches can be reduced. This results in improved performance by allowing an automated assistant to reduce a number of activations.

The above description is provided as an overview of some implementations of the present disclosure. Further description of those implementations, and other implementations, are described in more detail below.

Various implementations can include a non-transitory computer readable storage medium storing instructions executable by one or more processors (e.g., central processing unit(s) (CPU(s)), graphics processing unit(s) (GPU(s)), digital signal processor(s) (DSP(s)), and/or tensor processing unit(s) (TPU(s)) to perform a method such as one or more of the methods described herein. Other implementations can include an automated assistant client device (e.g., a client device including at least an automated assistant interface for interfacing with cloud-based automated assistant component(s)) that includes processor(s) operable to execute stored instructions to perform a method, such as one or more of the methods described herein. Yet other implementations can include a system of one or more servers that include one or more processors operable to execute stored instructions to perform a method such as one or more of the methods described herein.

DETAILED DESCRIPTION

Figure 1:
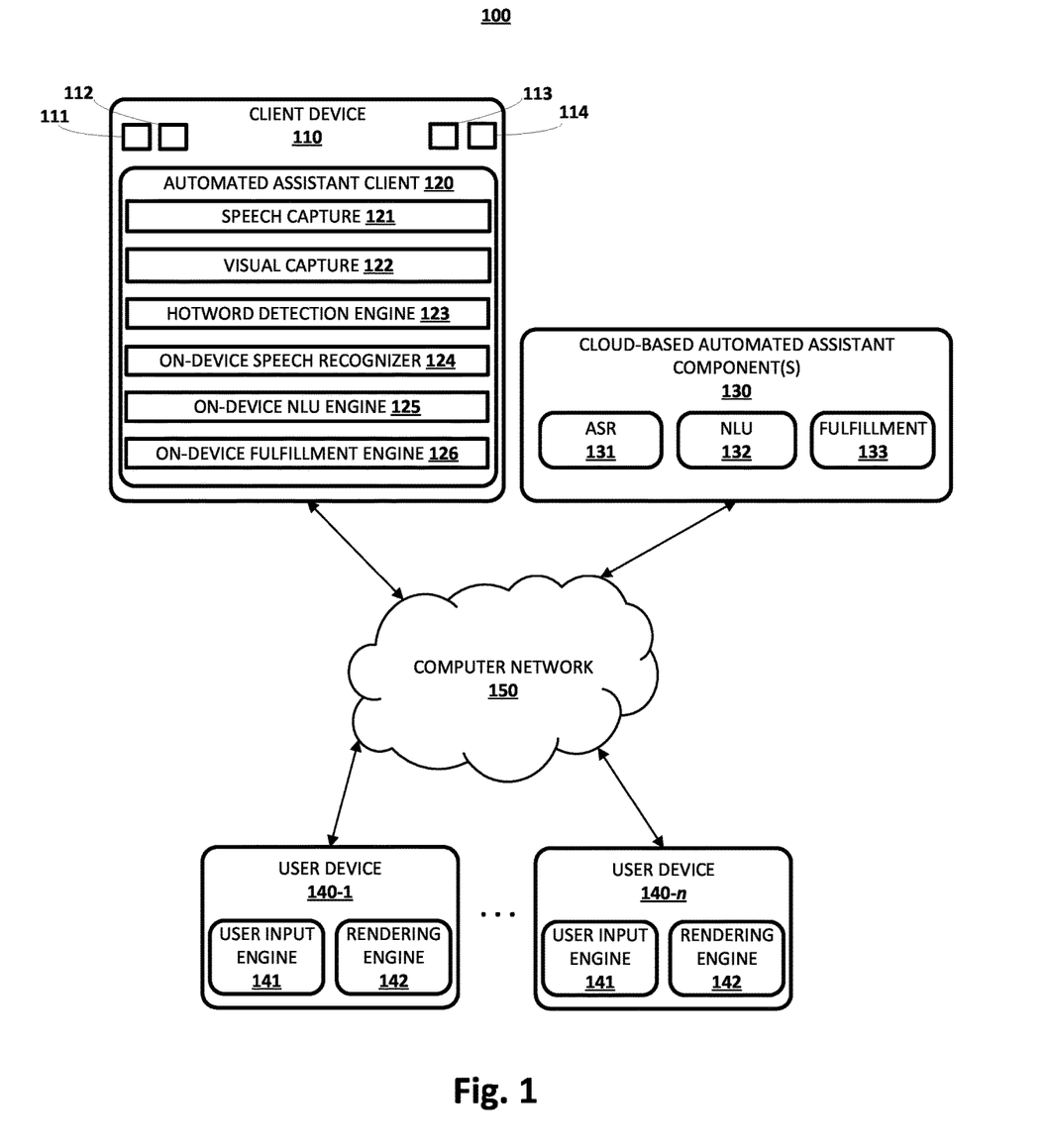
FIG. 1 schematically depicts an example environment in which selected aspects of the present disclosure may be implemented, in accordance with various implementations.

FIG. 1 schematically depicts an example environment 100 in which selected aspects of the present disclosure may be implemented, in accordance with various implementations. Any computing devices depicted in FIG. 1 or elsewhere in the figures may include logic such as one or more microprocessors (e.g., central processing units or "CPUs", graphical processing units or "GPUs") that execute computer-readable instructions stored in memory, or other types of logic such as application-specific integrated circuits ("ASIC"), field-programmable gate arrays ("FPGA"), and so forth. Some of the systems depicted in FIG. 1, such as cloud-based automated assistant component(s) 130, may be implemented using one or more server computing devices that form what is sometimes referred to as a "cloud infrastructure," although this is not required.

In implementations, the environment 100 may include a client device 110 (or multiple client devices 110) that implements an automated assistant client 120. The client device 110 is illustrated with one or more microphones 111, one or more speakers 112, one or more cameras and/or vision components 113, and display(s) 114 (e.g., a touch-sensitive display). The client device 110 may further include pressure sensor(s), proximity sensor(s), accelerometer(s), magnetometer(s), and/or other sensor(s) that are used to generate other sensor data that is in addition to audio data captured by the one or more microphones 111. The client device 110 at least selectively executes the automated assistant client 120. The automated assistant client 120 may include an on-device speech capture engine 121, an on-device visual capture engine 122, an on-device hotword detection engine 123, an on-device speech recognizer 124, an on-device natural language understanding (NLU) engine 125, and/or an on-device fulfillment engine 126. The automated assistant client 120 can include additional and/or alternative engines, such as a voice activity detector (VAD) engine, an endpoint detector engine, and/or other engine(s).

One or more cloud-based automated assistant component(s) 130 can optionally be implemented on one or more computing systems (collectively referred to as a "cloud" computing system) that are communicatively coupled to client device 110 via one or more local and/or wide area networks (e.g., the Internet) indicated generally at 150. The cloud-based automated assistant component(s) 130 can be implemented, for example, via a cluster of high-performance servers. In various implementations, an instance of an automated assistant client 120, by way of its interactions with one or more cloud-based automated assistant component(s) 130, may form what appears to be, from a user's perspective, a logical instance of an automated assistant with which the user may engage in human-to-computer interactions (e.g., spoken interactions, gesture-based interactions, and/or touch-based interactions).

The client device 110 may be used by two or more users and may be, for example: a standalone interactive speaker, a standalone interactive display device (which may also include a speaker and/or camera), a smart appliance such as a smart television (or a standard television equipped with a networked dongle with automated assistant capabilities), a desktop computing device, a laptop computing device, a tablet computing device, a mobile phone computing device, a computing device of a vehicle of the user (e.g., an in-vehicle communications system, an in-vehicle entertainment system, an in-vehicle navigation system), and/or a wearable apparatus of the user that includes a computing device (e.g., a watch of the user having a computing device, glasses of the user having a computing device, a virtual or augmented reality computing device). Additional and/or alternative client devices may be provided.

The one or more vision components 113 can take various forms, such as monographic cameras, stereographic cameras, a LIDAR component (or other laser-based component(s)), a radar component, etc. The one or more vision components 113 may be used, e.g., by the visual capture engine 122, to capture vision frames (e.g., image frames, laser-based vision frames) of an environment in which the client device 110 is deployed. In some implementations, such vision frame(s) can be utilized to determine whether a user is present near the client device 110 and/or a distance of the user (e.g., the user's face) relative to the client device 110. Such determination(s) can be utilized, for example, in determining whether to activate the various on-device machine learning engines depicted in FIG. 1, and/or other engine(s).

Speech capture engine 121 can be configured to capture user's speech and/or other audio data captured via microphone(s) 111. Further, the client device 110 may include pressure sensor(s), proximity sensor(s), accelerometer(s), magnetometer(s), and/or other sensor(s) that are used to generate other sensor data that is in addition to the audio data captured via the microphone(s) 111. As described herein, such audio data and other sensor data can be utilized by the hotword detection engine 123 and/or other engine(s) to determine whether to initiate one or more currently dormant automated assistant functions, refrain from initiating one or more currently dormant automated assistant functions, and/or shut down one or more currently active automated assistant functions. The automated assistant functions can include the on-device speech recognizer 124, the on-device NLU engine 125, the on-device fulfillment engine 126, and additional and/or alternative engines. For example, on-device speech recognizer 124 can process audio data that captures a spoken utterance, utilizing an on-device speech recognition model, to generate recognized text that corresponds to the spoken utterance. On-device NLU engine 125 performs on-device natural language understanding, optionally utilizing an on-device NLU model, on the recognized text to generate NLU data. The NLU data can include, for example, intent(s) that correspond to the spoken utterance and optionally parameter(s) (e.g., slot values) for the intent(s). Further, the on-device fulfillment engine 126 generates the fulfillment data, optionally utilizing an on-device fulfillment model, based on the NLU data. This fulfillment data can define local and/or remote responses (e.g., answers) to the spoken utterance, interaction(s) to perform with locally installed application(s) based on the spoken utterance, command(s) to transmit to Internet-of-things (IoT) device(s) (directly or via corresponding remote system(s)) based on the spoken utterance, and/or other resolution action(s) to perform based on the spoken utterance. The fulfillment data is then provided for local and/or remote performance/execution of the determined action(s) to resolve the spoken utterance. Execution can include, for example, rendering local and/or remote responses (e.g., visually and/or audibly rendering (optionally utilizing a local text-to-speech module)), interacting with locally installed applications, transmitting command(s) to IoT device(s), and/or other action(s).

Display(s) 114 can be utilized to display the recognized text from the on-device speech recognizer 124, and/or one or more results from the execution (e.g., search results responsive to a search query). Display(s) 114 can further be one of the user interface output component(s) through which visual portion(s) of a response, from the automated assistant client 120, is rendered.

In some implementations, cloud-based automated assistant component(s) 130 can include a remote ASR engine 131 that performs speech recognition, a remote NLU engine 132 that performs natural language understanding, and/or a remote fulfillment engine 133 that generates fulfillment. A remote execution module can also optionally be included that performs remote execution based on local or remotely determined fulfillment data. Additional and/or alternative remote engines can be included. In various implementations, on-device speech processing, on-device NLU, on-device fulfillment, and/or on-device execution can be prioritized at least due to the latency and/or network usage reductions they provide when resolving a spoken utterance (due to no client-server roundtrip(s) being needed to resolve the spoken utterance). However, one or more cloud-based automated assistant component(s) 130 can be utilized at least selectively. For example, such component(s) can be utilized in parallel with on-device component(s) and output from such component(s) utilized when local component(s) fail. For example, the on-device fulfillment engine 126 can fail in certain situations (e.g., due to relatively limited resources of client device 110) and remote fulfillment engine 133 can utilize the more robust resources of the cloud to generate fulfillment data in such situations. The remote fulfillment engine 133 can be operated in parallel with the on-device fulfillment engine 126 and its results utilized when on-device fulfillment fails, or can be invoked responsive to determining failure of the on-device fulfillment engine 126.

In various implementations, an NLU engine (on-device and/or remote) can generate NLU data that includes one or more annotations of the recognized text and one or more (e.g., all) of the terms of the natural language input. In some implementations an NLU engine is configured to identify and annotate various types of grammatical information in natural language input. For example, an NLU engine may include a morphological module that may separate individual words into morphemes and/or annotate the morphemes, e.g., with their classes. An NLU engine may also include a part of speech tagger configured to annotate terms with their grammatical roles. Also, for example, in some implementations an NLU engine may additionally and/or alternatively include a dependency parser configured to determine syntactic relationships between terms in natural language input.

In some implementations, an NLU engine may additionally and/or alternatively include an entity tagger configured to annotate entity references in one or more segments such as references to people (including, for instance, literary characters, celebrities, public figures, etc.), organizations, locations (real and imaginary), and so forth. In some implementations, an NLU engine may additionally and/or alternatively include a coreference resolver (not depicted) configured to group, or "cluster," references to the same entity based on one or more contextual cues. In some implementations, one or more components of an NLU engine may rely on annotations from one or more other components of the NLU engine.

An NLU engine may also include an intent matcher that is configured to determine an intent of a user engaged in an interaction with the automated assistant client 120. An intent matcher can use various techniques to determine an intent of the user. In some implementations, an intent matcher may have access to one or more local and/or remote data structures that include, for instance, a plurality of mappings between grammars and responsive intents. For example, the grammars included in the mappings can be selected and/or learned over time, and may represent common intents of users. For example, one grammar, "play <artist>", may be mapped to an intent that invokes a responsive action that causes music by the <artist> to be played on the client device 110. Another grammar, "[weather|forecast] today," may be match-able to user queries such as "what's the weather today" and "what's the forecast for today?" In addition to or instead of grammars, in some implementations, an intent matcher can employ one or more trained machine learning models, alone or in combination with one or more grammars. These trained machine learning models can be trained to identify intents, e.g., by embedding recognized text from a spoken utterance into a reduced dimensionality space, and then determining which other embeddings (and therefore, intents) are most proximate, e.g., using techniques such as Euclidean distance, cosine similarity, etc. As seen in the "play <artist>" example grammar above, some grammars have slots (e.g., <artist>) that can be filled with slot values (or "parameters"). Slot values may be determined in various ways. Often users will provide the slot values proactively. For example, for a grammar "Order me a <topping> pizza," a user may likely speak the phrase "order me a sausage pizza," in which case the slot <topping> is filled automatically. Other slot value(s) can be inferred based on, for example, user location, currently rendered content, user preferences, and/or other cue(s).

A fulfillment engine (local and/or remote) can be configured to receive the predicted/estimated intent that is output by an NLU engine, as well as any associated slot values and fulfill (or "resolve") the intent. In various implementations, fulfillment (or "resolution") of the user's intent may cause various fulfillment information (also referred to as fulfillment data) to be generated/obtained, e.g., by fulfillment engine. This can include determining local and/or remote responses (e.g., answers) to the spoken utterance, interaction(s) with locally installed application(s) to perform based on the spoken utterance, command(s) to transmit to Internet-of-things (IoT) device(s) (directly or via corresponding remote system(s)) based on the spoken utterance, and/or other resolution action(s) to perform based on the spoken utterance. The on-device fulfillment can then initiate local and/or remote performance/execution of the determined action(s) to resolve the spoken utterance.

In implementations, the environment 100 may also include user devices 140-1, . . . , 140-*n*, which may include, in various implementations, user input engine 141 and rendering engine 142. The user devices 140-1, . . . , 140-*n* may be in communication with client device 110 and/or cloud-based automated assistant component(s) 130 via computer network 150. Each of the user devices 140-1, . . . , 140-*n* may be a personal device of a user (e.g., a device that is typically used by a single user and less frequently used by multiple users) and may be, for example: a mobile phone computing device, a desktop computing device, a laptop computing device, a tablet computing device, and/or a wearable apparatus of the user that includes a computing device (e.g., a watch of the user having a computing device, glasses of the user having a computing device, a virtual or augmented reality computing device). Additional and/or alternative user devices may be provided.

The user input engine 141 can detect various types of user input at user devices 140-1, . . . , 140-*n*. The user input detected at user devices 140-1, . . . , 140-*n* can include spoken input detected via microphone(s) of user devices 140-1, . . . , 140-*n*, touch input detected via user interface input device(s) (e.g., touchscreen) of user devices 140-1, . . . , 140-*n*, and/or typed input detected via user interface input device(s) (e.g., via a virtual keyboard on a touchscreen) of user devices 140-1, . . . , 140-*n*. In some implementations, user devices 140-1, . . . , 140-*n* may be used to provide input to the automated assistant client 120 on the client device 110. For example, the user input detected via the user input engine 141 can include touch input directed to a search being performed using the automated assistant client 120, typed input that includes one or more terms of a search query, spoken input that includes one or more terms of a search query, and/or any other input directed to client devices 140-1, . . . , 140-*n* or the automated assistant client 120.

In some implementations, the automated assistant client 120 on the client device 110 may cause user devices 140-1, . . . , 140-*n* to render (e.g., using the rendering engine 142) visual portion(s) of a response, from the automated assistant client 120.

Figure 2:
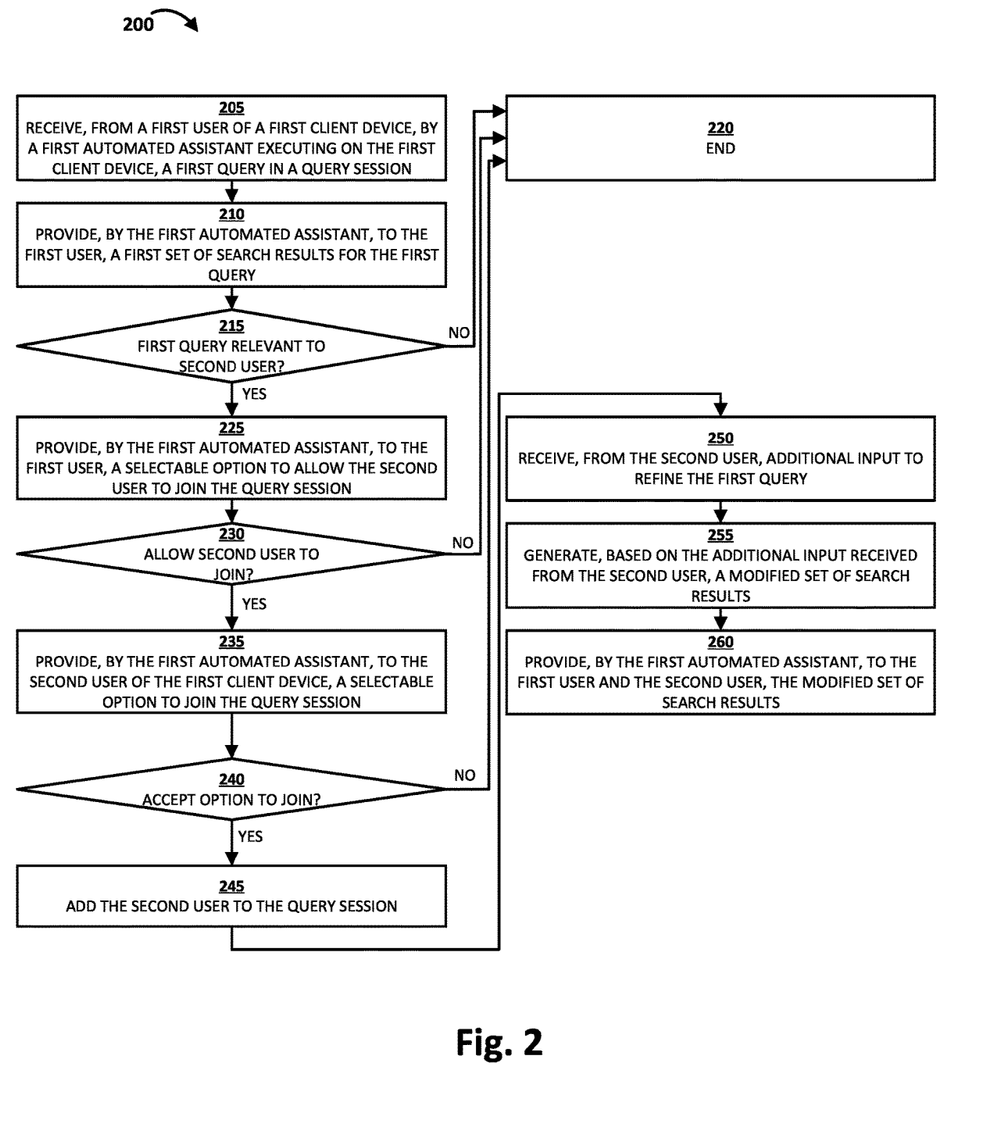
FIG. 2 depicts a flowchart illustrating an example method for practicing selected aspects of the present disclosure.

FIG. 2 is a flowchart illustrating an example method 200 for collaborative search sessions through an automated assistant, in accordance with implementations disclosed herein. For convenience, the operations of the flowchart are described with reference to a system that performs the operations. This system may include various components of various computer systems, such as one or more components of the client device 110. Moreover, while operations of method 200 are shown in a particular order, this is not meant to be limiting. One or more operations may be reordered, omitted, or added.

At block 205, the system receives, from a first user of a first client device, by a first automated assistant executing on the first client device, a first query in a query session. In implementations, at block 205, the automated assistant client 120 executing on the client device 110 may receive, from a first user of the client device 110, a first query in a query session. In some implementations, the query session may be a shopping session. For example, the first user may be shopping for a television, and the automated assistant client 120 may receive the query, "Computer, show me top-rated 65 inch televisions", which may be spoken by the first user.

At block 210, the system provides, by the first automated assistant, to the first user, a first set of search results for the first query. In implementations, at block 210, the automated assistant client 120 executing on the client device 110 may provide, to the first user, a first set of search results for the first query received at block 205. In some implementations, the automated assistant client 120 may provide the first set of search results by causing the first set of search results to be rendered on display(s) 114 of the client device 110 and/or rendered on a user device of the first user (e.g., one of the user devices 140-1, . . . , 140-*n*), e.g., by rendering engine 142. In some implementations, the first set of search results includes a first set of products. In the above example, the first set of search results may be a first set of televisions (e.g., a set of top-rated 65 inch televisions).

Still referring to block 210, in some implementations, the first client device (e.g., client device 110) may be an automated assistant device, and providing the first set of search results may include the first automated assistant (e.g., automated assistant client 120) causing the first set of search results to be provided on a display of a mobile device of the first user (e.g., one of the user devices 140-1, . . . , 140-*n*).

At block 215, the system determines, based on at least one term in the first query, whether or not the first query is relevant to a second user of the first client device. In implementations, at block 215, the automated assistant client 120 executing on the client device 110 may determine, based on at least one term in the first query received at block 205, whether or not the first query is relevant to a second user of the client device 110. In some implementations, the automated assistant client 120 may determine that the first query is relevant to the second user of the client device 110 based on a score for one of the at least one term in the first query satisfying a threshold. In some implementations, terms may be assigned scores and/or scores may be determined based upon an expected relevance of the term to other users of the client device. For example, terms associated with commonly shared products such as "television", "dishwasher", etc. may be associated with relatively higher scores (e.g., scores that satisfy the threshold), and terms associated with less commonly shared products such as "toothbrush", "socks", etc. may be associated with relatively lower scores (e.g., scores that do not satisfy the threshold).

In some implementations, an account associated with the first user and an account associated with the second user may belong to the same family account. In other implementations, an account associated with the first user and an account associated with the second user may both be signed in on the client device 110.

In some implementations, the automated assistant client 120 may determine that the first query is relevant to a second user of the first client device based on the second user having previously performed searches that are similar to the first query and/or based on the second user having previously performed searches that indicate a high likelihood of the second user being interested in the first query. For example, if the second user previously performed multiple searches related to new technology products, the automated assistant client 120 may infer that the second user is interested in new technology products and may determine that a first query related to a television is relevant to the second user. In some implementations, BERT-based (Bidirectional Encoder Representations from Transformers) or other machine-learning based approaches may be used to determine query similarity.

Still referring to block 215, in response to the automated assistant client 120 determining that the first query is not relevant to a second user of the first client device, flow proceeds to block 220, and the method ends. On the other hand, in response to the automated assistant client 120 determining that the first query is relevant to a second user of the first client device, flow proceeds to block 225.

Still referring to block 215, in some implementations, the automated assistant client 120 executing on the client device 110 may determine a predicted interest level of the second user in the query session. The automated assistant client 120 may further base the determining whether or not the first query is relevant to the second user on the predicted interest level of the second user in the query session satisfying a threshold. In some implementations, the automated assistant client 120 may determine the predicted interest level of the second user in the query session based on a query history of the second user.

Still referring to block 215, in some implementations, the automated assistant client 120 executing on the client device 110 may determine an environmental context. The automated assistant client 120 may further base the determining whether or not the first query is relevant to the second user on the environmental context.

For example, the environmental context at the time the first query is received at block 205 may include one or more signals that may be used to determine whether or not the first query is relevant to the second user. In a case in which the first query is provided by the first user in a "private" setting where no other person is detected in camera frame(s) at the time the first query is received at block 205 and/or during a threshold time period before and/or after the time when the first query is received, and/or where speech of another person is not detected by microphone(s), the automated assistant client 120 executing on the client device 110 may determine, based on one or more identified environmental signals, that the first query is not relevant to the second user. Likewise, in a case in which the first query is provided by the first user at a time when the automated assistant client 120 executing on the client device 110 determines no one else is home, the automated assistant client 120 executing on the client device 110 may determine, based on one or more identified environmental signals, that the first query is not relevant to the second user. Furthermore, in a case in which the first query is provided by the first user after the user enters a "private" or "incognito" mode (e.g., by saying, "let's make this private"), the automated assistant client 120 executing on the client device 110 may determine that the first query is not relevant to the second user.

On the other hand, in a case in which other users are present in a room in which the client device 110 is located, and/or when the automated assistant client 120 executing on the client device 110 determines that other users are nearby (e.g., another person, such as the second user, is detected in camera frame(s) at the time the first query is received at block 205 and/or during a threshold time period before and/or after the time when the first query is received, and/or speech of another person is detected by microphone(s)), the automated assistant client 120 executing on the client device 110 may determine that the first query is relevant to the second user. Likewise, in a case in which the automated assistant client 120 executing on the client device 110 is frequently used by other users (e.g., at least a threshold proportion of queries are made by other persons, such as the second user, and/or at least a threshold number of queries are made by other persons, such as the second user), the automated assistant client 120 executing on the client device 110 may determine that the first query is relevant to the second user.

In particular, the automated assistant client 120 may identify one or more environmental signals associated with the environment in which the first user of the client device 110 is located when the first query is received at block 205. The one or more environmental signals can include, for example, location information that corresponds to a location of the first user when the first query is received at block 205, audio data that captures environmental noise of the environment when the first query is received at block 205, and/or vision data that captures the environment when the first query is received at block 205.

For example, continuing the above example, assume a first user of the client device 110 submits the search query, "Computer, show me top-rated 65 inch televisions". Further assume that when the user submits the search query, the one or more environmental signals indicate that the first user is located at home in their living room, and another person is present in the living room in close proximity to the first user. In this example, the automated assistant client 120 may determine, based on one or more identified environmental signals, such as the proximity of the second user to the first user and the location information (living room), that the first query is relevant to the second user.

Alternatively, assume that when the user submits the search query, the one or more environmental signals indicate that the first user is located at home in their office, and no other person is present in the office. In this example, the automated assistant client 120 may determine, based on one or more identified environmental signals, such absence of other persons in proximity to the first user and the location information (office), that the first query is not relevant to the second user.

Still referring to block 215, in some implementations, the automated assistant client 120 executing on the client device 110 may determine a frequency of interaction of the second user with the client device 110. The automated assistant client 120 may further base the determining whether or not the first query is relevant to the second user on the frequency of interaction of the second user with the client device 110 satisfying a threshold.

At block 225, the system provides, by the first automated assistant, to the first user, a selectable option to allow the second user of the first client device to join the query session. In implementations, at block 225, in response to determining, at block 215, that the first query is relevant to a second user of the client device 110, the automated assistant client 120 executing on the client device 110 may provide, to the first user, a selectable option to allow the second user of the client device 110 to join the query session. In some implementations, the automated assistant client 120 may provide the selectable option, e.g., by visually rendering the selectable option (e.g., "Do you want to allow User 2 to participate in the search?") on a user interface of the client device 110, and/or by audibly rendering the selectable option on the client device 110.

At block 230, the system determines whether or not an indication of acceptance of the selectable option to allow the second user of the first client device to join the query session has been received. In some implementations, the first user may provide, via a user interface of the client device 110, a user input (e.g., a tap or a click) that is an indication of acceptance or rejection of the selectable option to allow the second user of the first client device to join the query session. Alternatively, the first user may provide a spoken response (e.g., "Yes" or "No") that is an indication of acceptance or rejection of the selectable option to allow the second user of the first client device to join the query session.

Still referring to block 230, in implementations, in response to the automated assistant client 120 determining that an indication of acceptance of the selectable option to allow the second user of the first client device to join the query session, provided at block 225, has not been received (e.g., a rejection of the selectable option is received), flow proceeds to block 220, and the method ends. On the other hand, in response to the automated assistant client 120 determining that an indication of acceptance of the selectable option to allow the second user of the first client device to join the query session, provided at block 225, has been received, flow proceeds to block 235.

At block 235, the system provides, by the first automated assistant, to the second user of the first client device, a selectable option to join the query session, in response to determining that the first query is relevant to the second user. In implementations, at block 235, in response to determining, at block 215, that the first query is relevant to the second user of the client device 110, the automated assistant client 120 executing on the client device 110 may provide, to the second user of the first client device 110, a selectable option to join the query session. In some implementations, the automated assistant client 120 providing the selectable option to join the query session is further in response to receiving, at block 230, from the first user, an indication of acceptance of the selectable option to allow the second user of the first client device 110 to join the query session. In some implementations, the automated assistant client 120 may provide the selectable option, e.g., by visually rendering the selectable option (e.g., "User 2, would you like to participate in the search?") on a user interface of the client device 110, and/or by audibly rendering the selectable option on the client device 110.

At block 240, the system determines whether or not an indication of acceptance of the selectable option to join the query session has been received from the second user. In some implementations, the second user may provide, via a user interface of the client device 110, a user input (e.g., a tap or a click) that is an indication of acceptance or rejection of the selectable option to join the query session. Alternatively, the second user may provide a spoken response (e.g., "Yes" or "No") that is an indication of acceptance or rejection of the selectable option to join the query session.

Still referring to block 240, in implementations, in response to the automated assistant client 120 determining that an indication of acceptance of the selectable option to join the query session, provided at block 235, has not been received (e.g., a rejection of the selectable option is received), flow proceeds to block 220, and the method ends. On the other hand, in response to the automated assistant client 120 determining that an indication of acceptance of the selectable option to join the query session, provided at block 235, has been received, flow proceeds to block 245.

At block 245, in response to receiving, from the second user, an indication of acceptance of the selectable option to join the query session, the system adds the second user to the query session. In implementations, at block 245, in response to receiving, at block 240, from the second user, an indication of acceptance of the selectable option to join the query session, the automated assistant client 120 executing on the client device 110 may add the second user to the query session.

Still referring to block 245, in some implementations, a member of the query session (e.g., the second user) may be able to send messages or comments (e.g., regarding products or other search results of interest, feedback, desired options/constraints, etc.) to other members of the query session (e.g., the first user) or flag search results for other members of the query session via the automated assistant client 120 executing on the client device or via an automated assistant client executing on one of the user devices 140-1, ..., 140-n (e.g., a mobile device of the user). In some implementations, members of the query session may be able to add/remove products in a shared shopping cart. In some implementations, the automated assistant client 120 may obtain approval from one member (e.g., a designated administrator), multiple members (e.g., two parents), or all members of the query session before allowing a product to be added/removed in the shopping cart. In other implementations, members may be able to add/remove products in the shopping cart, without requiring approval from other members of the query session.

At block 250, the system receives, from the second user, additional input to refine the first query. In implementations, at block 250, the automated assistant client 120 executing on the client device 110 may receive, from the second user, additional input to refine the first query received at block 205. The additional input may be provided by the second user via a user interface of the client device 110, e.g., via a touchscreen. For example, the second user may tap on a touchscreen to select a filter (e.g., "price under $1,000", "no red ones", "HDMI 2.1 only", etc.) for the first set of search results, the filter being applied, removed, or modified based on the user input. Alternatively, additional input may be spoken by the second user. For example, the second user may say, "I'd like a 4K model". In other implementations, the additional input that is received may be a ranking of the first search results by the second user.

Still referring to block 250, in some implementations, the additional input provided by the second user may be displayed in the user interface of the client device 110 or the user interface of one of the user devices 140-1, ..., 140-n. For example, the additional input (e.g., preferences) of the second user may be displayed in a visually separate manner, e.g., through a separate column or other visual affordance on display(s) 114 of the client device 110. For example, each user may be represented by a circle on the user interface on display(s) 114, and tapping one of the circles may reveal additional input (e.g., preferences) of the selected user. For example, tapping the circle representing the second user on the user interface may cause the second user's additional input, "I'd like a 4K model", to be displayed in the user interface, and annotated with the user (e.g., second user) that added the additional input.

Still referring to block 250, in some implementations, a second client device receives the additional input. The second client device may be another client device 110 or may be one of the user devices 140-1, ..., 140-n. In particular, in some implementations, the additional input may be provided by the second user via a user interface of another client device 110 or one of the user devices 140-1, ..., 140-n, which may in turn provide the additional input to the automated assistant client 120 on the client device 110.

At block 255, the system generates, based on the additional input received from the second user, a modified set of search results. In implementations, at block 255, the automated assistant client 120 executing on the client device 110 may generate, based on the additional input received from the second user at block 250, a modified set of search results.

Still referring to block 255, in some implementations, generating the modified set of search results includes the system determining, by the first automated assistant, a second query based on the first query and the additional input, and generating the modified set of search results based on a second set of search results for the second query. In particular, the automated assistant client 120 executing on the client device 110 may determine a second query based on the first query received at block 205 and the additional input received at block 250 and may generate the modified set of search results based on a second set of search results for the second query. For example, in the case of a first query, "Computer, show me top-rated 65 inch televisions", and additional input "I'd like a 4K model", the automated assistant client 120 may determine the second query, "top-rated 65 inch 4K televisions".

Still referring to block 255, in other implementations, generating the modified set of search results includes the system filtering the first set of search results based on the additional input. In particular, the automated assistant client 120 executing on the client device 110 may filter the first set of search results from block 210 based on the additional input received at block 250. For example, in the case of a first query, "Computer, show me top-rated 65 inch televisions", and additional input "I'd like a 4K model", the automated assistant client 120 may determine that "4K" is an attribute by which to filter, and the automated assistant client 120 may filter the first set of search results from block 210 to identify and display a subset of the first set of search results that are associated with the "4K" attribute and hide other search results of the first set of search results that are not in the subset associated with the "4K" attribute.

Still referring to block 255, in other implementations, generating the modified set of search results includes the system reordering the first set of search results based on a ranking provided at block 250 and optionally hiding or removing products that are not included in the ranking. In some implementations, when the ranking provided at block 250 includes similar or near-duplicate items, users may vote on the item they think is most suitable given the options. In some implementations, a ranking of advertisements that are displayed may be determined based on the ranking provided at block 250.

Still referring to block 255, in other implementations, instead of generating the modified set of search results (e.g., by merging the additional input received from the second user into the search session), additional input (e.g., preferences) of the second user may be displayed in a visually separate manner, e.g., through a separate column or other visual affordance on display(s) 114 of the client device 110. For example, each user may be represented by a circle on the user interface on display(s) 114, and tapping one of the circles may reveal preferences of the selected user. In some implementations, preferences of one or more other users may be temporarily enabled/disabled or may be removed completely, e.g., with an option to provide an explanatory message to other users in the session (e.g., "I'd really prefer not to buy a red TV, is that okay?").

Still referring to block 255, in some implementations, the system automatically determines, by the first automated assistant, a filter term based on an inferred preference of the second user. The system may generate the modified set of search results further based on the filter term. In some implementations, the inferred preference may be based on past searches of the second user.

At block 260, the system provides, by the first automated assistant, to the first user and the second user, the modified set of search results. In implementations, at block 260, the automated assistant client 120 executing on the client device 110 may provide, to the first user and the second user, the modified set of search results generated at block 255. In some implementations, the automated assistant client 120 may provide the modified set of search results by causing the modified set of search results to be rendered on display(s) 114 of the client device 110 and/or rendered on a user device of the first user (e.g., one of the user devices 140-1, . . . , 140-n), e.g., by rendering engine 142, and/or rendered on a user device of the second user (e.g., one of the user devices 140-1, . . . , 140-n), e.g., by rendering engine 142. In some implementations, the modified set of search results includes a modified set of products. In the above example, the modified set of search results may be a modified set of televisions (e.g., a set of top-rated 65 inch 4K televisions).

Still referring to block 260, in some implementations, providing the modified set of search results may include the first automated assistant (e.g., automated assistant client 120) causing the modified set of search results to be provided on the display of the mobile phone of the first user (e.g., one of the user devices 140-1, . . . , 140-n) and on a display of a mobile device of the second user (e.g., another of the user devices 140-1, . . . , 140-n).

In some implementations, the operations of some or all of blocks 215 through 260 may be repeated, optionally with respect to additional users (e.g., a third user). Additionally, during subsequent iterations, the additional input received at block 250 may be used to further refine the first query and may be received from the first user, the second user, and/or additional users.

Figure 3:
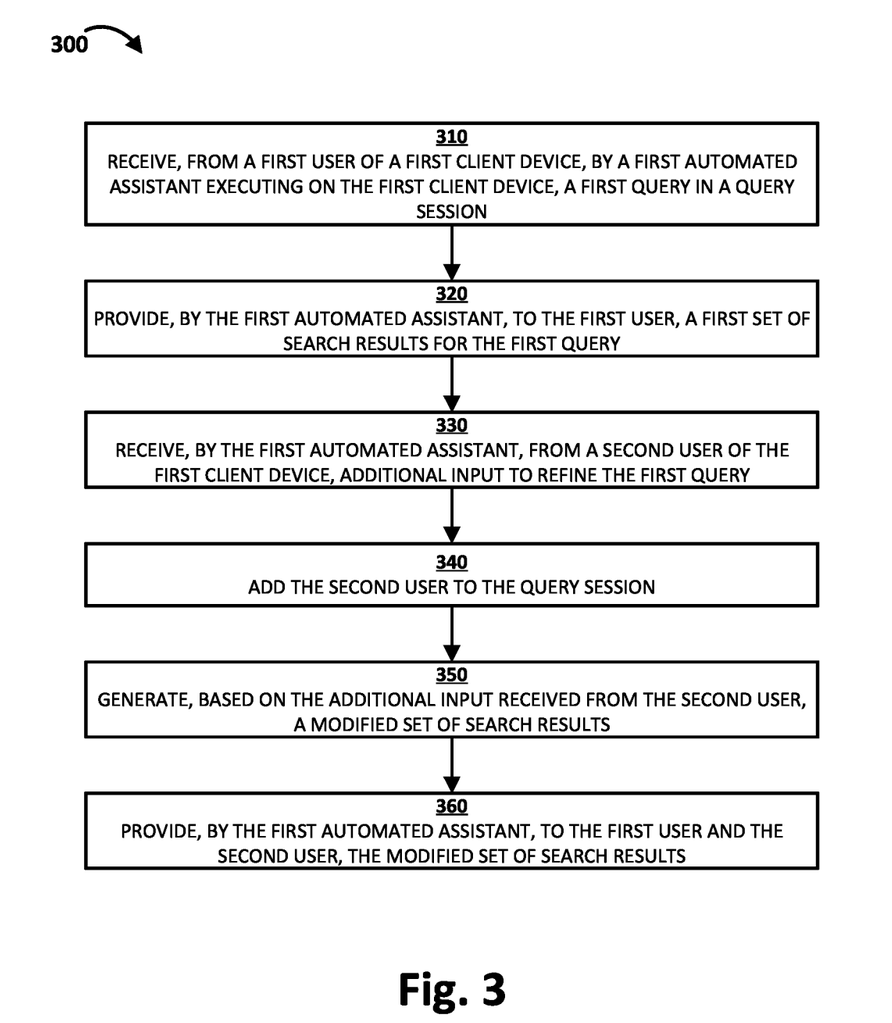
FIG. 3 depicts another flowchart illustrating an example method for practicing selected aspects of the present disclosure

FIG. 3 is a flowchart illustrating an example method 300 for collaborative search sessions through an automated assistant, in accordance with implementations disclosed herein. For convenience, the operations of the flowchart are described with reference to a system that performs the operations. This system may include various components of various computer systems, such as one or more components of the client device 110. Moreover, while operations of method 300 are shown in a particular order, this is not meant to be limiting. One or more operations may be reordered, omitted, or added.

At block 310, the system receives, from a first user of a first client device, by a first automated assistant executing on the first client device, a first query in a query session. In implementations, at block 310, the automated assistant client 120 executing on the client device 110 may receive, from a first user of the client device 110, a first query in a query session. In some implementations, the query session may be a shopping session. For example, the first user may be shopping for a television, and the automated assistant client 120 may receive the query, "Computer, show me top-rated 65 inch televisions", which may be spoken by the first user.

At block 320, the system provides, by the first automated assistant, to the first user, a first set of search results for the first query. In implementations, at block 320, the automated assistant client 120 executing on the client device 110 may provide, to the first user, a first set of search results for the first query received at block 310. In some implementations, the automated assistant client 120 may provide the first set of search results by causing the first set of search results to be rendered on display(s) 114 of the client device 110 and/or rendered on a user device of the first user (e.g., one of the user devices 140-1, . . . , 140-n), e.g., by rendering engine 142. In some implementations, the first set of search results includes a first set of products. In the above example, the first set of search results may be a first set of televisions (e.g., a set of top-rated 65 inch televisions).

Still referring to block 320, in some implementations, the first client device (e.g., client device 110) may be an automated assistant device, and providing the first set of search results may include the first automated assistant (e.g., automated assistant client 120) causing the first set of search results to be provided on a display of a mobile device of the first user (e.g., one of the user devices 140-1, . . . , 140-*n*).

At block 330, the system receives, by the first automated assistant, from a second user of the first client device, additional input to refine the first query. In implementations, at block 330, the automated assistant client 120 executing on the client device 110 may receive, from the second user, additional input to refine the first query received at block 310. The additional input may be provided by the second user via a user interface of the client device 110, e.g., via a touchscreen. For example, the second user may tap on a touchscreen to select a filter (e.g., "price under $1,000", "no red ones", "HDMI 2.1 only", etc.) for the first set of search results. Alternatively, additional input may be spoken by the second user. For example, the second user may say, "I'd like a 4K model".

At block 340, in response to receiving, from the second user, the additional input to refine the first query, the system adds the second user to the query session. In implementations, at block 340, in response to receiving, at block 330, from the second user, additional input to refine the first query, the automated assistant client 120 executing on the client device 110 may add the second user to the query session.

Still referring to block 340, in some implementations, a member of the query session (e.g., the second user) may be able to send messages or comments (e.g., regarding products or other search results of interest, feedback, desired options/constraints, etc.) to other members of the query session (e.g., the first user) or flag search results for other members of the query session via the automated assistant client 120 executing on the client device or via an automated assistant client executing on one of the user devices 140-1, . . . , 140-*n* (e.g., a mobile device of the user). In some implementations, members of the query session may be able to add/remove products to a shared shopping cart. In some implementations, the automated assistant client 120 may obtain approval from one member (e.g., a designated administrator), multiple members (e.g., two parents), or all members of the query session before allowing a product to be added to/removed from the shopping cart. In other implementations, members may be able to add products to/remove products from the shopping cart, without requiring approval from other members of the query session.

Still referring to block 340, in some implementations, the system (e.g., the automated assistant client 120 of the client device 110) may determine an identity of the second user, e.g., based on a voice of the second user detected by a microphone of the first client device (e.g., one or more microphones 111 of the client device 110), based on a face of the second user detected by a camera of the first client device (e.g., one or more cameras and/or other vision components 113 of the client device 110), and/or using other wireless signals, such as Bluetooth signals that may be used to detect the presence of the second user's smartwatch. The system (e.g., the automated assistant client 120 of the client device 110) may identify a mobile device of the second user based on the identity of the second user. In some implementations, adding the second user to the query session in response to receiving the additional input may include adding the mobile phone of the second user to the query session. Additionally, in some implementations, providing the modified set of search results to the second user may include the first automated assistant (e.g., the automated assistant client 120 of the client device 110) causing the modified set of search results to be provided on a display of the mobile phone of the second user (e.g., one of the user devices 140-1, . . . , 140-*n*) based on adding the mobile phone of the second user to the query session.

Still referring to block 340, in other implementations, the system (e.g., the automated assistant client 120 of the client device 110) may determine an identity of the second user, e.g., based on a voice of the second user detected by a microphone of the first client device (e.g., one or more microphones 111 of the client device 110) or based on a face of the second user detected by a camera of the first client device (e.g., one or more cameras and/or other vision components 113 of the client device 110). The system (e.g., the automated assistant client 120 of the client device 110) may identify a user account of the second user based on the identity of the second user. In some implementations, adding the second user to the query session in response to receiving the additional input may include adding the user account of the second user to the query session. Additionally, in some implementations, providing the modified set of search results to the second user may be based on subsequently detecting the second user (e.g., by the automated assistant client 120 of the client device 110) based on the voice of the second user or based on the face of the second user.

At block 350, the system generates, based on the additional input received from the second user, a modified set of search results. In implementations, at block 350, the automated assistant client 120 executing on the client device 110 may generate, based on the additional input received from the second user at block 340, a modified set of search results.

Still referring to block 350, in some implementations, generating the modified set of search results includes the system determining, by the first automated assistant, a second query based on the first query and the additional input, and generating the modified set of search results based on a second set of search results for the second query. In particular, the automated assistant client 120 executing on the client device 110 may determine a second query based on the first query received at block 310 and the additional input received at block 330 and may generate the modified set of search results based on a second set of search results for the second query. For example, in the case of a first query, "Computer, show me top-rated 65 inch televisions", and additional input "I'd like a 4K model", the automated assistant client 120 may determine the second query, "top-rated 65 inch 4K televisions".

Still referring to block 350, in other implementations, generating the modified set of search results includes the system filtering the first set of search results based on the additional input. In particular, the automated assistant client 120 executing on the client device 110 may filter the first set of search results from block 320 based on the additional input received at block 330. For example, in the case of a first query, "Computer, show me top-rated 65 inch televisions", and additional input "I'd like a 4K model", the automated assistant client 120 may determine that "4K" is an attribute by which to filter, and the automated assistant client 120 may filter the first set of search results from block 320 to identify a subset of the first set of search results that are associated with the "4K" attribute.

Still referring to block 350, in some implementations, the system automatically determines, by the first automated assistant, a filter term based on a preference of the second user inferred based on one or more searches previously performed by the user. The system may generate the modified set of search results further based on the filter term.

At block 360, the system provides, by the first automated assistant, to the first user and the second user, the modified set of search results. In implementations, the modified set of search results may be provided to the second user based on adding the second user to the query session at block 340. In implementations, at block 360, the automated assistant client 120 executing on the client device 110 may provide, to the first user and the second user, the modified set of search results generated at block 350. In some implementations, the automated assistant client 120 may provide the modified set of search results by causing the modified set of search results to be rendered on display(s) 114 of the client device 110 and/or rendered on a user device of the first user (e.g., one of the user devices 140-1, . . . , 140-n), e.g., by rendering engine 142, and/or rendered on a user device of the second user (e.g., one of the user devices 140-1, . . . , 140-n), e.g., by rendering engine 142. In some implementations, the modified set of search results includes a modified set of products. In the above example, the modified set of search results may be a modified set of televisions (e.g., a set of top-rated 65 inch 4K televisions).

Still referring to block 360, in some implementations, providing the modified set of search results may include the first automated assistant (e.g., automated assistant client 120) causing the modified set of search results to be provided on the display of the mobile phone of the first user (e.g., one of the user devices 140-1, . . . , 140-n) and on a display of a mobile device of the second user (e.g., another of the user devices 140-1, . . . , 140-n).

Still referring to block 360, in some implementations, providing the modified set of search results may include the automated assistant client 120 causing the modified set of search results to be provided on display(s) 114 of the client device 110 responsive to determining that the first user and/or the second user is in proximity to (e.g., in the same room as) the client device 110. For example, the automated assistant client 120 may determine that the first user and/or the second user is in proximity to the client device 110 based on detecting a voice of the first user and/or the second user by one or more microphones 111 of the client device 110 or based on detecting a face of the first user and/or the second user by one or more cameras and/or other vision components 113 of the client device 110.

Still referring to block 360, in some implementations, the automated assistant client 120 may avoid providing the modified set of search results responsive to determining (e.g., using one or more microphones 111 and/or one or more cameras and/or other vision components 113 of the client device 110) that a person other than the first user and/or the second user is in proximity to the client device 110, e.g., to avoid ruining an element of surprise with respect to a gift.

In some implementations, the operations of some or all of blocks 330 through 360 may be repeated, optionally with respect to additional users (e.g., a third user). Additionally, during subsequent iterations, the additional input received at block 330 may be used to further refine the first query and may be received from the first user, the second user, and/or additional users.

Figure 4:
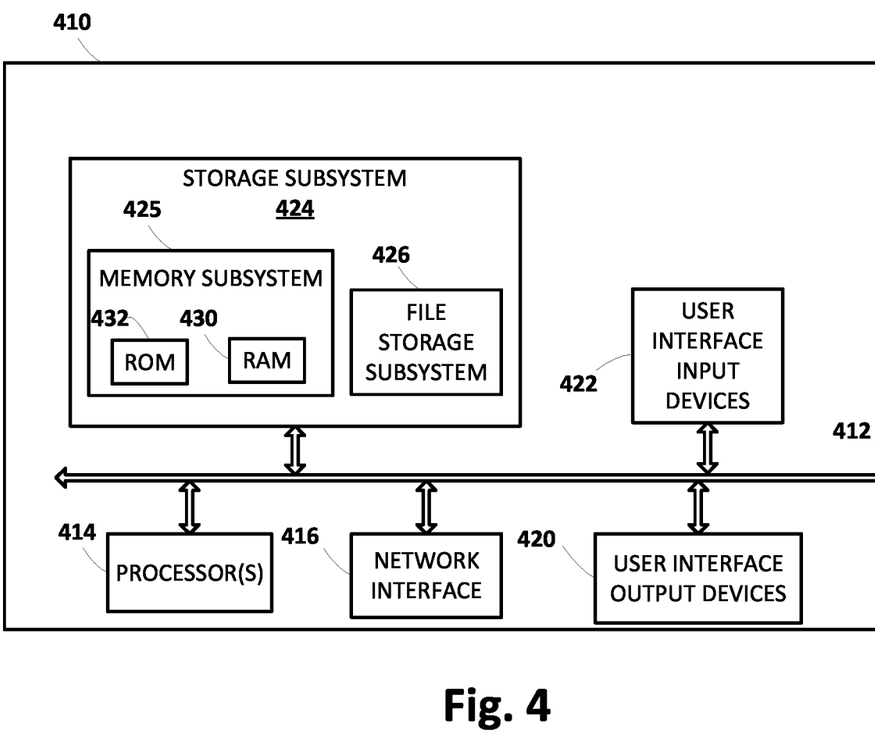
FIG. 4 depicts an example architecture of a computing device.

FIG. 4 is a block diagram of an example computing device 410 that may optionally be utilized to perform one or more aspects of techniques described herein. In some implementations, one or more of a client device, cloud-based automated assistant component(s), and/or other component(s) may comprise one or more components of the example computing device 410.

Computing device 410 typically includes at least one processor 414 which communicates with a number of peripheral devices via bus subsystem 412. These peripheral devices may include a storage subsystem 424, including, for example, a memory subsystem 425 and a file storage subsystem 426, user interface output devices 420, user interface input devices 422, and a network interface subsystem 416. The input and output devices allow user interaction with computing device 410. Network interface subsystem 416 provides an interface to outside networks and is coupled to corresponding interface devices in other computing devices.

User interface input devices 422 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 410 or onto a communication network.

User interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 410 to the user or to another machine or computing device.

Storage subsystem 424 stores programming and data constructs that provide the functionality of some or all of the modules described herein. For example, the storage subsystem 424 may include the logic to perform selected aspects of the methods disclosed herein, as well as to implement various components depicted in FIG. 1.

These software modules are generally executed by processor 414 alone or in combination with other processors. The memory subsystem 425 included in the storage subsystem 424 can include a number of memories including a main random access memory (RAM) 430 for storage of instructions and data during program execution and a read only memory (ROM) 432 in which fixed instructions are stored. A file storage subsystem 426 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 426 in the storage subsystem 424, or in other machines accessible by the processor(s) 414.

Bus subsystem 412 provides a mechanism for letting the various components and subsystems of computing device 410 communicate with each other as intended. Although bus subsystem 412 is shown schematically as a single bus, alternative implementations of the bus subsystem may use multiple busses.

Computing device 410 can be of varying types including a workstation, server, computing cluster, blade server, server farm, or any other data processing system or computing device. Due to the ever-changing nature of computers and networks, the description of computing device 410 depicted in FIG. 4 is intended only as a specific example for purposes of illustrating some implementations. Many other configurations of computing device 410 are possible having more or fewer components than the computing device depicted in FIG. 4.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, the method comprising:
   receiving, from a first user of a first client device, by a first automated assistant executing on the first client device, a first query in a query session;
   providing, by the first automated assistant, to the first user, a first set of search results for the first query;
   determining a frequency of interaction, of a second user of the first client device, with the first client device;
   determining a score for at least one term in the first query, wherein the score is determined based on an expected relevance of the at least one term to users of the first client device other than the first user, the expected relevance being based on a degree to which usage of an item associated with the at least one term is typically shared amongst multiple users;
   determining, based on (i) the frequency of interaction of the second user with the first client device satisfying a threshold and (ii) the score for the at least one term in the first query, that the first query is relevant to the second user;
   providing, by the first automated assistant, to the second user of the first client device, a selectable option to join the query session, in response to determining that the first query is relevant to the second user;
   in response to receiving, from the second user, an indication of acceptance of the selectable option to join the query session, adding the second user to the query session;
   receiving, from the second user, additional input to refine the first query;
   generating, based on the additional input received from the second user, a modified set of search results; and
   providing, by the first automated assistant, to the first user and the second user, the modified set of search results.

2. The method according to claim 1, wherein:
   the query session is a shopping session;
   the first set of search results comprises a first set of products; and
   the modified set of search results comprises a modified set of products.

3. The method according to claim 1, wherein:
   the first client device is an automated assistant device;
   providing the first set of search results comprises the first automated assistant causing the first set of search results to be provided on a display of a mobile device of the first user; and
   providing the modified set of search results comprises the first automated assistant causing the modified set of search results to be provided on the display of the mobile device of the first user and on a display of a mobile device of the second user.

4. The method according to claim 1, further comprising providing, by the first automated assistant, to the first user, a selectable option to allow the second user of the first client device to join the query session, and
   wherein providing, to the second user, the selectable option to join the query session is further in response to receiving, from the first user, an indication of acceptance of the selectable option to allow the second user of the first client device to join the query session.

5. The method according to claim 1, further comprising determining a predicted interest level of the second user in the query session,
   wherein determining that the first query is relevant to the second user is further based on the predicted interest level of the second user in the query session satisfying an interest level threshold.

6. The method according to claim 5, wherein determining the predicted interest level of the second user in the query session is based on a query history of the second user.

7. The method according to claim 1, further comprising determining an environmental context,
   wherein determining that the first query is relevant to the second user is further based on the environmental context.

8. The method according to claim 1, wherein determining that the first query is relevant to the second user of the first client device is based on the score for the at least one term in the first query satisfying a score threshold.

9. The method according to claim 1, further comprising automatically determining, by the first automated assistant, a filter term based on an inferred preference of the second user,
   wherein generating the modified set of search results is further based on the filter term.

10. The method according to claim 1, wherein a second client device receives the additional input.

11. The method according to claim 1, wherein generating the modified set of search results comprises:
    determining, by the first automated assistant, a second query based on the first query and the additional input; and
    generating the modified set of search results based on a second set of search results for the second query.

12. The method according to claim 1, wherein generating the modified set of search results comprises filtering the first set of search results based on the additional input.

13. A system comprising:
    a processor, a computer-readable memory, one or more computer-readable storage media, and program instructions collectively stored on the one or more computer-readable storage media, the program instructions executable to:
    receive, from a first user of a first client device, by a first automated assistant executing on the first client device, a first query in a query session;

provide, by the first automated assistant, to the first user, a first set of search results for the first query;

determine a frequency of interaction, of a second user of the first client device, with the first client device;

determine a score for at least one term in the first query, wherein the score is determined based on an expected relevance of the at least one term to users of the first client device other than the first user, the expected relevance being based on a degree to which usage of an item associated with the at least one term is typically shared amongst multiple users;

determine, based on (i) the frequency of interaction of the second user with the first client device satisfying a threshold and (ii) the score for the at least one term in the first query, that the first query is relevant to the second user;

provide, by the first automated assistant, to the second user of the first client device, a selectable option to join the query session, in response to determining that the first query is relevant to the second user;

in response to receiving, from the second user, an indication of acceptance of the selectable option to join the query session, add the second user to the query session;

receive, from the second user, additional input to refine the first query;

generate, based on the additional input received from the second user, a modified set of search results; and provide, by the first automated assistant, to the first user and the second user, the modified set of search results.

14. The method according to claim 1, wherein a term associated with a more commonly shared item is associated with a relatively higher score than a term associated with a less commonly shared item.

15. A computer program product comprising one or more non-transitory computer-readable storage media having program instructions collectively stored on the one or more non-transitory computer-readable storage media, the program instructions executable to:

receive, from a first user of a first client device, by a first automated assistant executing on the first client device, a first query in a query session;

provide, by the first automated assistant, to the first user, a first set of search results for the first query;

determine a frequency of interaction, of a second user of the first client device, with the first client device;

determine a score for at least one term in the first query, wherein the score is determined based on an expected relevance of the at least one term to users of the first client device other than the first user, the expected relevance being based on a degree to which usage of an item associated with the at least one term is typically shared amongst multiple users;

determine, based on (i) the frequency of interaction of the second user with the first client device satisfying a threshold and (ii) the score for the at least one term in the first query, that the first query is relevant to the second user;

provide, by the first automated assistant, to the second user of the first client device, a selectable option to join the query session, in response to determining that the first query is relevant to the second user;

in response to receiving, from the second user, an indication of acceptance of the selectable option to join the query session, add the second user to the query session;

receive, from the second user, additional input to refine the first query;

generate, based on the additional input received from the second user, a modified set of search results; and provide, by the first automated assistant, to the first user and the second user, the modified set of search results.

16. The computer program product according to claim 15, wherein:
the query session is a shopping session;
the first set of search results comprises a first set of products; and
the modified set of search results comprises a modified set of products.

17. The computer program product according to claim 15, wherein:
the first client device is an automated assistant device;
providing the first set of search results comprises the first automated assistant causing the first set of search results to be provided on a display of a mobile device of the first user; and
providing the modified set of search results comprises the first automated assistant causing the modified set of search results to be provided on the display of the mobile device of the first user and on a display of a mobile device of the second user.

18. The computer program product according to claim 15, wherein:
the program instructions are further executable to provide, by the first automated assistant, to the first user, a selectable option to allow the second user of the first client device to join the query session; and
providing, to the second user, the selectable option to join the query session is further in response to receiving, from the first user, an indication of acceptance of the selectable option to allow the second user of the first client device to join the query session.

19. The computer program product according to claim 15, wherein:
the program instructions are further executable to determine a predicted interest level of the second user in the query session; and
determining that the first query is relevant to the second user is further based on the predicted interest level of the second user in the query session satisfying an interest level threshold.

20. The computer program product according to claim 19, wherein determining the predicted interest level of the second user in the query session is based on a query history of the second user.

* * * * *